Nov. 16, 1926.
F. SLAVICĚK
DIRECTION SIGNAL
Filed Oct. 3, 1924
1,607,488
2 Sheets-Sheet 1
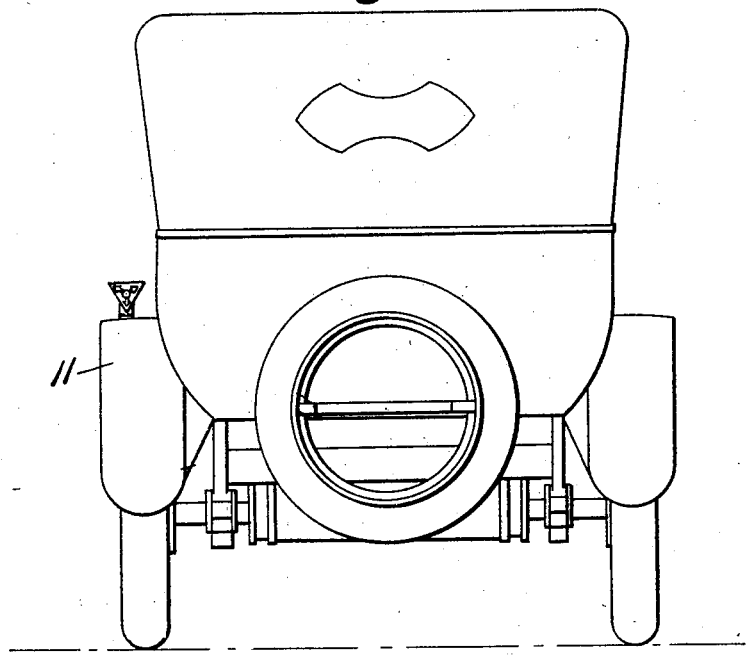
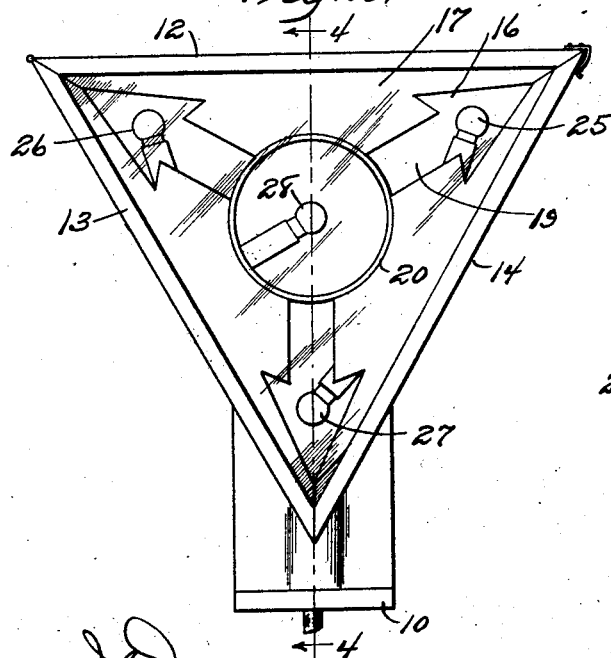
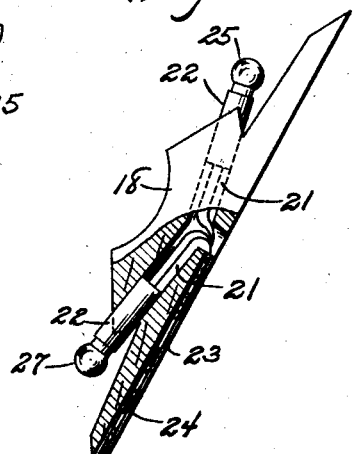
Frank Slaviček
INVENTOR
BY Victor J. Evans
ATTORNEY Nov. 16, 1926.　　　　　　　　　　　　　1,607,488
F. SLAVICĚK
DIRECTION SIGNAL
Filed Oct. 3, 1924　　2 Sheets-Sheet 2
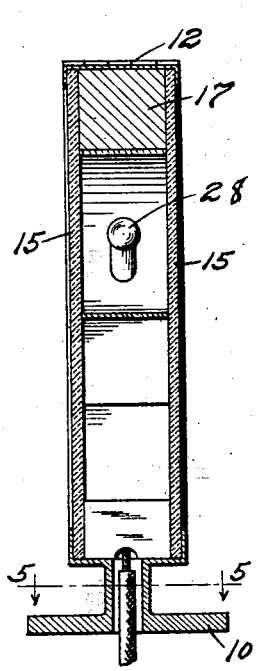
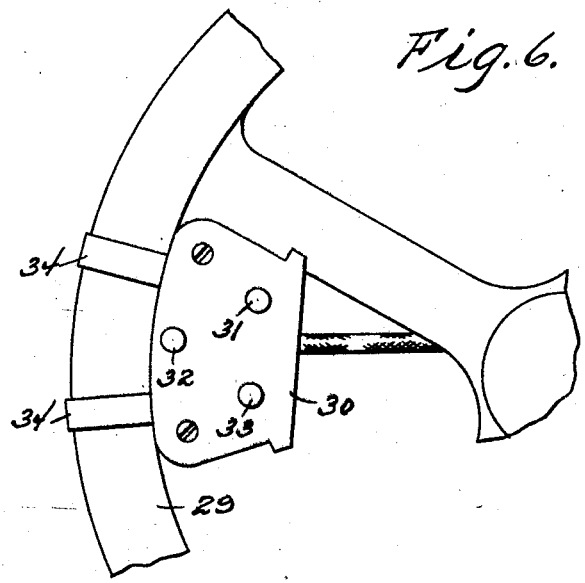
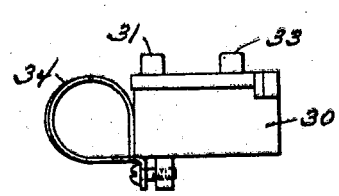
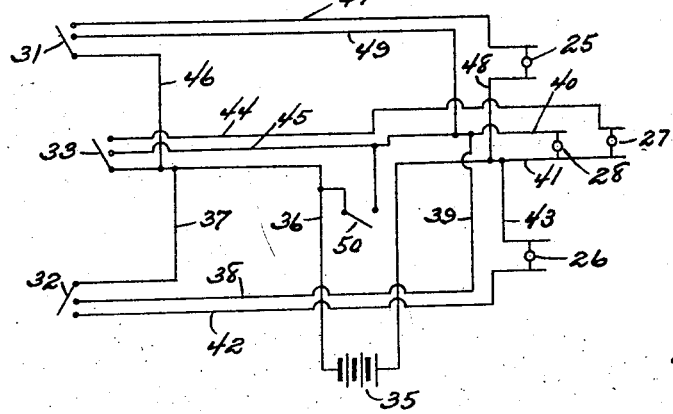
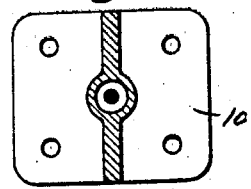
Frank Slavicek
INVENTOR Patented Nov. 16, 1926.

1,607,488

UNITED STATES PATENT OFFICE.

FRANK SLAVICĚK, OF HAMILTON CITY, CALIFORNIA.

DIRECTION SIGNAL.

Application filed October 3, 1924. Serial No. 741,463.

This invention contemplates the provision of a direction signal for motor operated vehicles, wherein use is made of a casing provided with a plurality of direction indicating arrows which radiate from a central compartment, each arrow and said compartment being provided with an electric lamp arranged in normally open circuits, with means whereby the lamps in said arrows are adapted to be selectively lighted in combination with the lamp in said compartment when the device is used as a direction signal, while the lamp in said compartment is capable of being lighted independently of said arrows to permit of its use in the capacity of a parking light.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a rear elevation of a motor operated vehicle showing how the signal is mounted upon one of the fenders thereof.

Figure 2 is an enlarged view in elevation of the signal.

Figure 3 is a view partly in section of one of the blocks used in the production of the signal.

Figure 4 is a sectional view taken on line 4—4 of Figure 2.

Figure 5 is a sectional view taken on line 5—5 of Figure 4.

Figure 6 is a fragmentary view of the steering wheel showing how the switch is mounted thereon.

Figure 7 is a view of the switch taken at a right angle to Figure 6.

Figure 8 is a diagrammatic view of the circuits.

The signal forming the subject matter of the present invention comprises a casing which is preferably of triangular formation as clearly illustrated in Figure 2, the casing being mounted upon a base 10 which is adapted to be secured on the rear left fender 11 of the vehicle, occupying a position where it can be readily seen from either the front or rear of the vehicle. This casing includes a frame the sides of which are indicated at 12, 13 and 14 respectively, each side being of substantially U-shape formation in cross section as shown in Figure 4. The front and rear walls of the casing are preferably constructed of glass, although other suitable transparent material may be used, the walls being indicated at 15. Arranged within the casing between the front and rear walls is a plurality of blocks which are preferably constructed of wood, all of the blocks being identical in construction and preferably of the configuration illustrated in Figures 2 and 3. It will be noted that each block is substantially triangular in form, with two of its sides notched or cut away as at 16, the body of each block being indicated at 17. The innermost corner of each block is recessed as at 18 and 16, so that when all of the blocks are grouped within the casing as shown in Figure 2, the adjacent notches or cut away portions 16 of said blocks unitedly define the head of an arrow the body portion of which is indicated at 19. In addition to forming the arrows in the manner just described, the recesses 18 of the various blocks unitedly define a central compartment, which is adapted to receive a tubular member 20 having end openings in align with the arrows 19. Two of the three blocks illustrated support a pair of electric lamps, and one of these blocks is formed with oppositely extending bores 21 which receive the sockets 22 of electric light lamps as shown, while the block is also formed with a groove 23 through which the electric wires 24 are passed. The remaining block 17 does not support any bulbs, and is merely provided with the recesses 16 and 18 respectively as above mentioned. It will be noted that the three lamps arranged at the corners of the casing represent right, left and stop signals and are indicated at 25, 26 and 27 respectively. Consequently the right turn signal and the stop signals 25 and 27 are carried by one of these blocks, while the left turn signal 26 is carried by another of said blocks. This last mentioned block also carries an electric lamp 28 which is disposed within the central compartment formed by the recess 18 of said blocks, the arrangement of this lamp 28 being such that it occupies a position in align with all of the arrows 19. All of these signal lamps are connected in normally open circuits, which include a switch mounted on the steering wheel 28 of the vehicle, so that the signal lamps 25, 26 and 27 can be selectively lighted in combination with the lamp 28 arranged in the compartment above referred to. By reason of this fact any one arrow can be illuminated throughout its entire length to indicate to pedestrians and drivers of other vehicles when the machine so equipped is going to turn to the right, to the left or be brought to a stop. In addition to this fact the lamp 28 of the central compartment can be lighted independently of any of the arrows 19, to permit the central compartment and lamp 28 to be used in the capacity of a parking light. The switch is generally indicated at 30, and is preferably of the push button type, there being three of such buttons indicated at 31, 32 and 33 respectively which are used in connection with the right, left and stop signals. Each button makes contact with three wires. The signal may be mounted on any appropriate part of the vehicle, but is preferably supported on the steering wheel 19 by means of loops 34 so that the signal will be arranged within convenient reach of the operator, to allow him to operate the signals without removing his hands from the steering wheel.

The various electric lamps are preferably connected in circuits in the manner illustrated in Figure 8, wherein it will be noted that there is a single wire leading from the battery, and two wires leading from the signals to the battery. The battery of course is indicated at 35. For instance when it is desired to light the lamp 26 in combination with the lamp 28, and thus indicate to others that the vehicle is about to turn to the left, the switch 32 is closed whereupon the current passes from the battery 35 through the wire 36 to the wire 37, then through the switch 32. From there it passes through the wire 38 to the wire 39, and from the wire 39 through the wire 40 to the lamp 28 in the central compartment. The current passes through the lamp and wire 41 back to the battery as shown in Figure 8. The current also passes from the switch 32 through the wire 42 to the lamp 26 which constitutes the left turn signal, passing from this signal through the wire 43 to the wire 41, which wire of course returns the current to the battery.

When it is desired to use the stop signal, the switch 33 is closed whereupon the current passes from the battery through the wire 36 to the switch, and from the switch through the wire 44 to the signal 27, and thence from this signal back to the battery through the wire 41. At the same time the current passes through the wire 45 to the signal lamp 28 arranged centrally of the casing, and from this lamp back to the battery through the wire 41.

When it is desired to operate the right turn signal, the switch 31 is closed, whereupon the current flows from the battery through the wire 36, to the switch through the wire 46. The current then passes through the switch and wire 47 to the signal 25, and from this signal to the return wire 41 through the wire 48.

The current also passes through the switch 31 and wire 49 to the wire 40, and then through the wire 40 to the center signal 28 and thence back to the battery through the wire 41. Manifestly when the right, left and stop signals can be operated simultaneously with the center signal 28, the latter mentioned signal can also be used independently of the other signals in the capacity of a parking light. For this purpose it is only necessary to use the switch 50 which is of course mounted on the dash board of the vehicle, and when this switch is closed the current will pass direct from the battery to the lamp 28 and thus return to the wire 41. The device may be readily assembled or disassembled as the occasion may require by simply opening the casing on its hinge, whereupon the blocks on two sides of the casing can be readily inserted in the position shown in Figure 2, and then the upper block 17 arranged within the casing to repose upon the aforementioned blocks. The portions 18 of the blocks are curved to accommodate the member 20 which can be positioned centrally of the casing between the adjacent parts of the blocks and frictionally held in position. The socket and bulb 28 can then be arranged within this member 20 and threaded or otherwise suitably associated with the adjacent block. The bulbs carried by these blocks are of course associated with the latter, except bulb 28, before they are placed within the casing, and when all of the blocks are in the casing, as shown in Figure 2, the side 12 of the casing is closed and clamped in its closed position. Of course the transparent members 15 are arranged in place after the blocks, bulbs and member 20 are in position.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. In a direction signal of the character described, a triangular shaped casing, a plurality of blocks arranged in the casing, each block being substantially triangular in form, corresponding inner corners of said blocks being cut away and curved whereby all of said blocks unitedly define a central compartment, a tubular member adapted to be received within said compartment, the adjacent sides of each of said blocks being notched and shaped to define arrow-like compartments radiating from the central compartment, electric light bulbs arranged in said compartments, and each of said arrows, said bulbs being carried by certain of said blocks.

2. In a direction signal of the character described, a substantially triangular shaped casing including a hinged side, a plurality of blocks arranged within the casing and having their adjacent sides notched, each block being substantially triangular in form, with the adjacent sides of said blocks being designed to form a plurality of direction indicating arrow-like compartments radiating from the center of said signal, electric light bulbs carried by certain of said blocks, and arranged with one bulb in each arrow, the corresponding inner corners of the respective blocks being cut away and curved to define a central compartment, a tubular member arranged in the central compartment and electric light bulb carried by one of said blocks and arranged within said tubular member for the purpose specified.

In testimony whereof I affix my signature.

FRANK SLAVICĚK.